No. 737,913. PATENTED SEPT. 1, 1903.
O. ELISON.
MOWING MACHINE.
APPLICATION FILED OCT. 13, 1902.
NO MODEL. 5 SHEETS—SHEET 1.
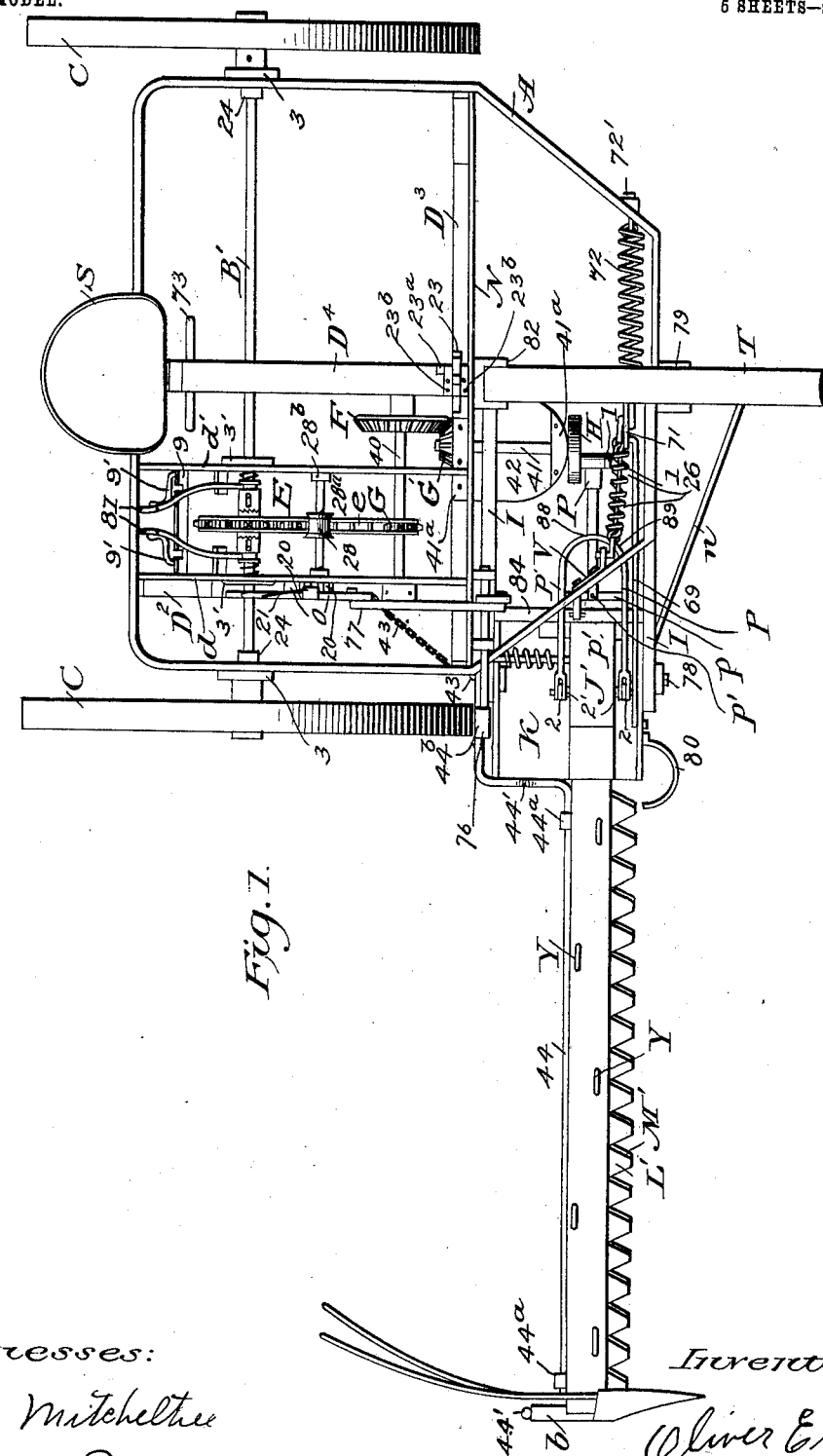
Fig. I.
Witnesses:
J C Mitchelltree
Clemens Erlander
Inventor:
Oliver Elison No. 737,913. PATENTED SEPT. 1, 1903.
O. ELISON.
MOWING MACHINE.
APPLICATION FILED OCT. 13, 1902.
NO MODEL. 5 SHEETS—SHEET 2.
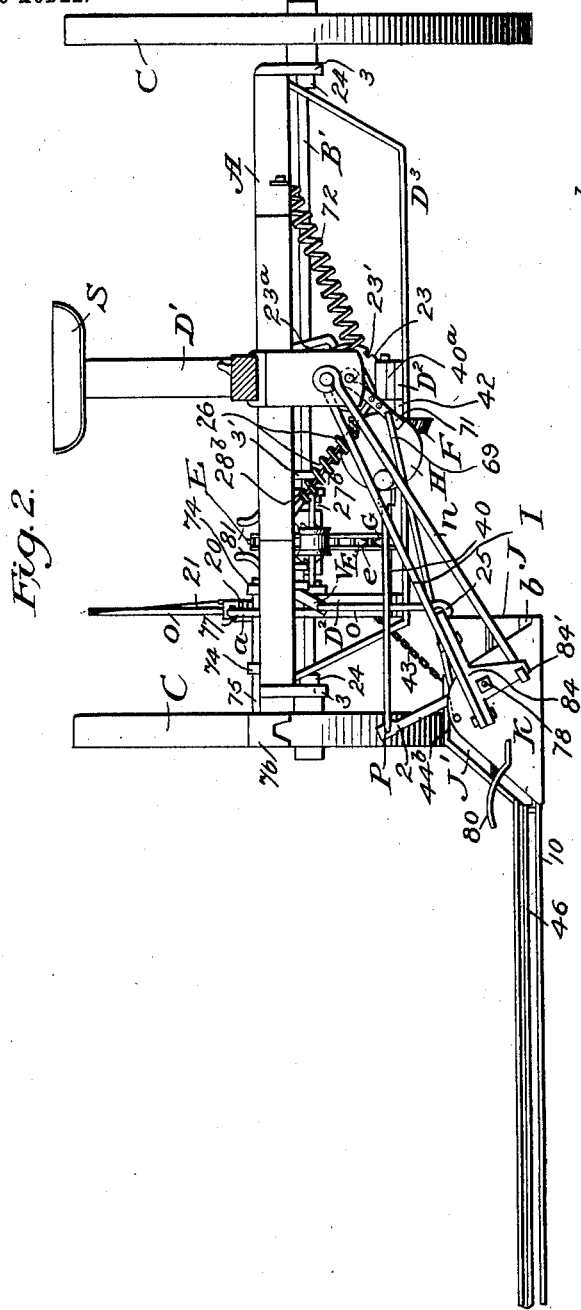
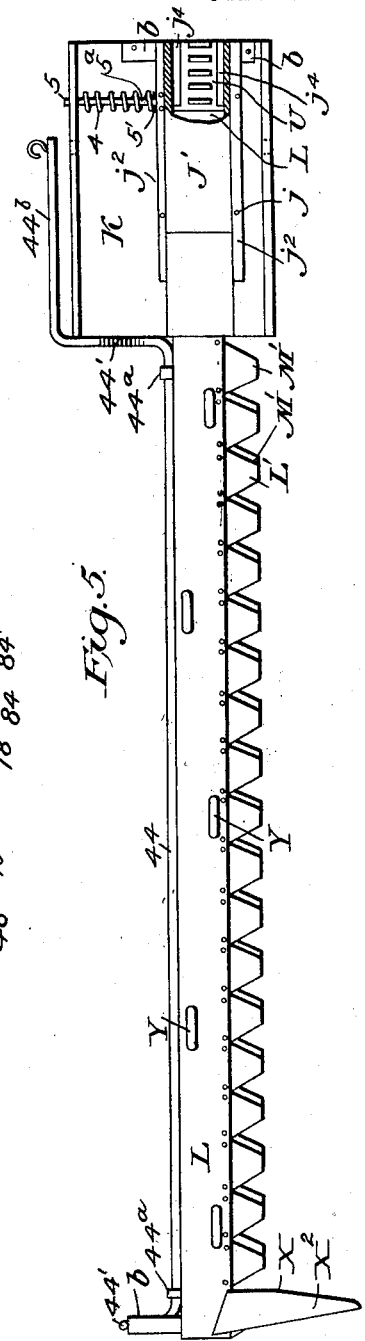
Witnesses:
Inventor:
Oliver Elison No. 737,913. PATENTED SEPT. 1, 1903.
O. ELISON.
MOWING MACHINE.
APPLICATION FILED OCT. 13, 1902.
NO MODEL. 5 SHEETS—SHEET 3.
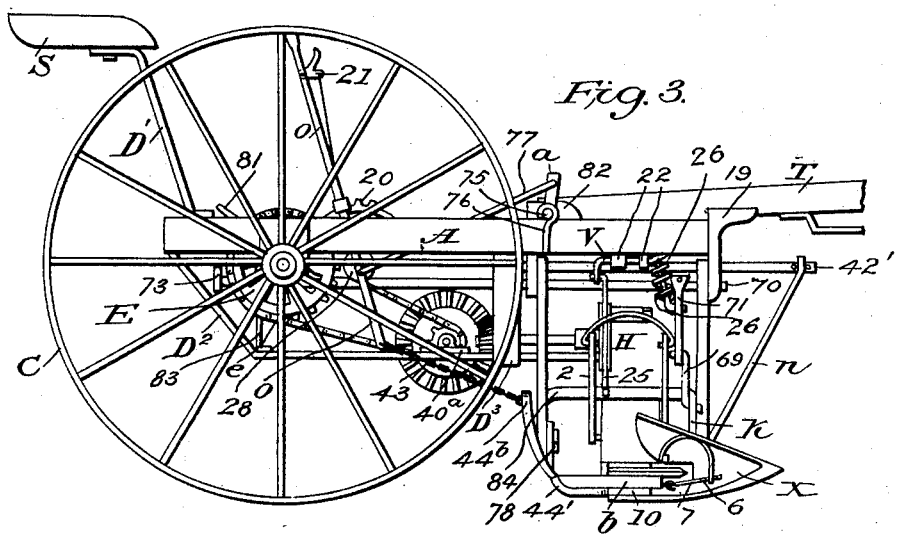
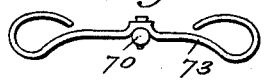
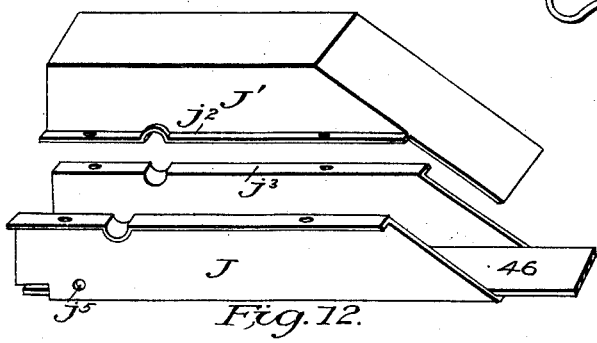
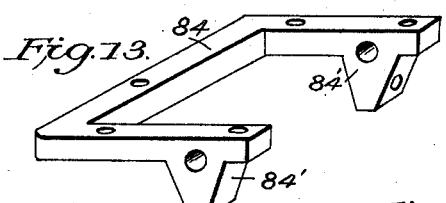
Witnesses: Inventor:
Oliver Elison No. 737,913. PATENTED SEPT. 1, 1903.
O. ELISON.
MOWING MACHINE.
APPLICATION FILED OCT. 13, 1902.
NO MODEL. 5 SHEETS—SHEET 4.
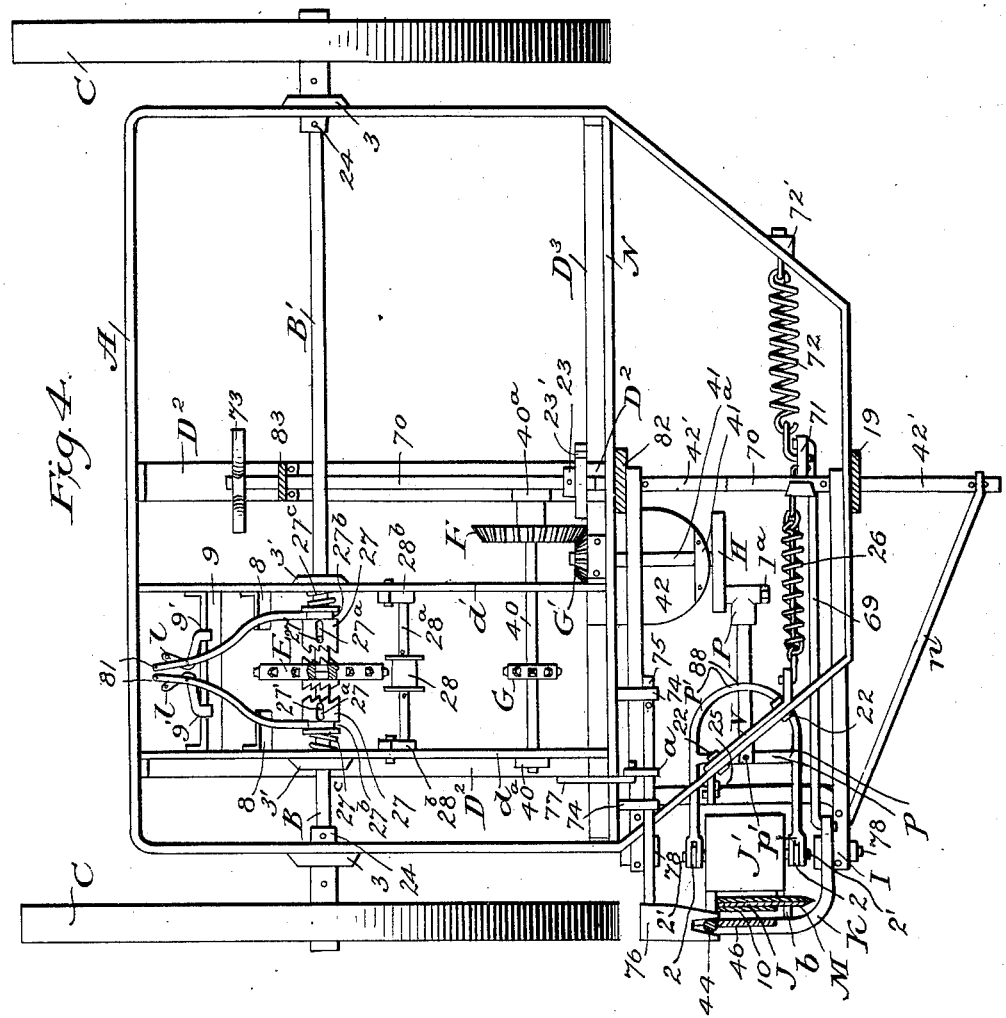
Witnesses:
J C Mitchell
Clemens Erlander
Inventor:
Oliver Elison

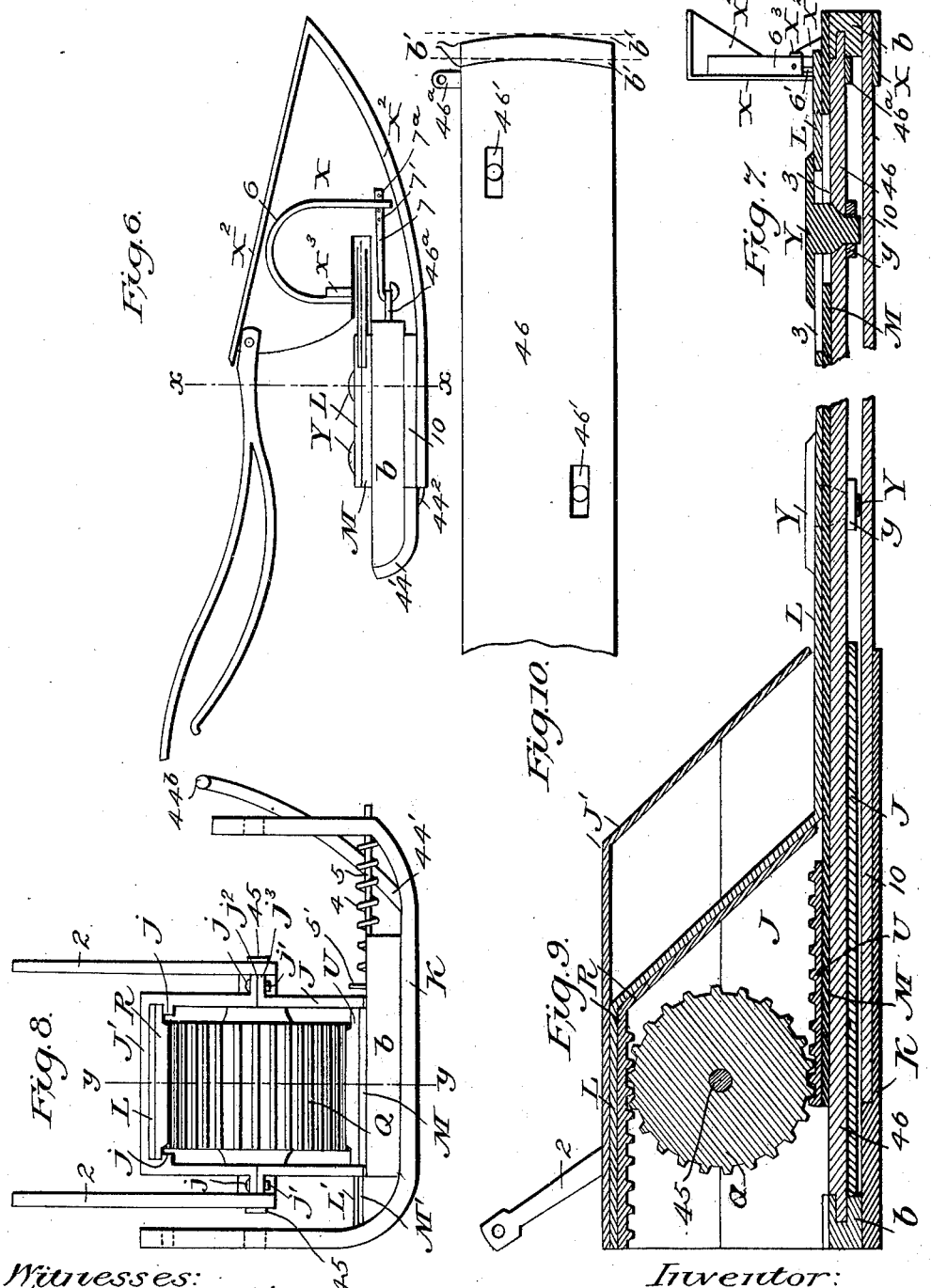

No. 737,913.

Patented September 1, 1903.

UNITED STATES PATENT OFFICE.

OLIVER ELISON, OF CONCORD, NEBRASKA.

MOWING-MACHINE.

SPECIFICATION forming part of Letters Patent No. 737,913, dated September 1, 1903.

Application filed October 13, 1902. Serial No. 127,121. (No model.)

*To all whom it may concern:*

Be it known that I, OLIVER ELISON, a citizen of the United States, residing at Concord, in the county of Dixon and State of Nebraska, have invented a new and useful Mowing-Machine, of which the following is a specification.

The objects of my invention are to provide in a mowing-machine a mechanism for shifting the cutter-bars, by which means they are protected from injury when they encounter any obstructions, to increase the cutting power of the machine, and to greatly reduce the speed or motion of its mechanism; to provide a mechanism operated with the feet by means of which the drag-bar and cutter-bars are controlled, raised to a perfect upright position, also lowered; to provide a mechanism for raising and lowering the drag-bar and cutter-bars independently of the main frame for high and close cutting without tilting the main frame, drag-bar, or cutter-bars, and, further, to provide a mechanism which dispenses with the clutch mechanism in the hubs of the drive-wheels, which admits the use of drive-wheels of light weight. These advantages also admit of greatly reducing the weight, draft, and wear of the machine. All of these advantages are obtained by the combination of the several parts, as described hereinafter.

In the accompanying drawings, Figure 1 is a top view of a mowing-machine embodying my invention. Fig. 2 is a front elevation of the same. Fig. 3 is a side elevation of the same. Fig. 4 is a top view of the machine with portions removed. Fig. 5 is a top view of the cutting apparatus with portions removed. Fig. 6 is an enlarged view of the outer end of the cutting apparatus. Fig. 7 is a sectional view taken on the line $x\,x$ of Fig. 6. Fig. 8 is an enlarged view of the inner end of the cutting apparatus. Fig. 9 is a sectional view on the line $y\,y$ of Fig. 8. Fig. 10 is an enlarged top view of the outer end of the guide-bar. Fig. 11 is a perspective view of the upper portion of the box secured to the guide-bar. Fig. 12 is a similar view of the lower portion of the same. Fig. 13 is a perspective view of the yoke. Fig. 14 is an enlarged view of the outer ends of the cutter-bars and guide-bar. Fig. 15 is an enlarged view of the foot-loops secured to the rock-shaft. Fig. 16 is a perspective view of the keepers.

The main frame A, the upper transverse bar N, the lower transverse bar $D^3$, the upper central longitudinal bar $D^4$, the lower longitudinal bars $D^2\,D^2$, and the parallel bars $d\,d'$ constitute the framework of the machine. The main axle B, which is divided in two parts, is revolubly held to the main frame A by means of bearings 3 3, secured to the sides of the main frame, and the bearings 3' 3', secured to the parallel bars $d'$ and drive-wheels C C, are rigidly secured to this axle. A tongue T is secured to the main frame by means of a bearing 82, secured to the transverse bar N, and a bearing 19, secured to the front portion of the main frame. These bearings extend downward below the main frame and are perforated to receive a supporting-shaft 42' and a rock-shaft 70. A bar 83, fixed between the bars $D^4$ and $D^2$, supports the rear end of the rock-shaft.

The shaft 42' extends forward of the main frame A, and a coupling-frame consisting of the arms I I, a bar $n$, and a yoke 84 is pivoted to this shaft, the bar $n$ extending from the forward end of this shaft to the downward-extending front portion 84' of the yoke 84. The transverse bar $D^3$ and the two longitudinal bars $D^2\,D^2$ curve downward to support the driving mechanism, the forward ends of the bars $D^2$ being secured to the bars $D^3$.

The small sprocket-wheel G and the large bevel-gear F, rigidly secured to the transverse shaft 40, held by the bearings $40^a$, secured to the bars $D^2$, the small bevel-pinion $G'$ and the crank H, rigidly secured to the crank-shaft 41, held by the bearings $41^a$, secured to a forward-extending support 42, secured to the bar $D^3$, the large sprocket-wheel E, held upon the main axle B, and the endless chain belt $e$ upon these sprocket-wheels constitute the driving mechanism within the main frame.

A drag-bar 10, having a divide, or shoe X secured to its outer end and a shoe K secured to its inner end, is pivoted to the yoke 84 of the coupling-frame by means of pins 78 78, which extend through corresponding holes in the shoe K and this yoke.

The mechanism for shifting the cutter-bars comprise the grooved keeper $b$, secured to the outer end of the drag-bar 10, and the keeper b, also grooved, secured within the shoe K at the inner end of the drag-bar, the guide-bar 46 working in the grooves of these keepers, the forwardly-drawing bow-spring 6, secured to a projection X³ of the shoe X, the lug 46ᵃ, secured to the under side of the outer end of this guide-bar, the link 7, which connects this lug and the forwardly-drawing bow-spring, the bar 5, provided with a pin 5', the forward end of this bar pressing against the lower box J, its rear end projecting through an opening in the rear portion of the shoe K, and the forwardly-pressing coiled spring 4 upon this bar. (Shown in Figs. 6, 7, 8, 9, and 10.)

Secured to the inner end of the guide-bar 46 is a box J. This box is in two parts, their corresponding edges being bent outward to form flanges $j^2 j^3$, the upper portion J' of the box being secured to the lower portion J by means of bolts $i$, extending through corresponding holes in these flanges and secured by nuts $j'$ upon these bolts. Extending from the box J and reposing upon the guide-bar 46 are two cutter-bars or sickles L M. These cutter-bars are provided with corresponding longitudinal slots 3, and the guide-bar is provided with tapering holes 46' opposite the slots 3 in the cutter-bars. Guides Y, extending through the slots 3 in the cutter-bars and the holes 46', hold and guide the cutter-bars upon the guide-bar 46, these guides and holes tapering from their edges, the lower ends of the guides terminating in bolt conformations and are threaded to receive nuts $y$, which secure these guides to the said guide-bar, as shown in Fig. 7. A rack U is secured to the inner end of the lower cutter-bar, and a rack R is secured to the inner end of the upper cutter-bar.

Extending through the box J is a rock-shaft 45, the two parts constituting this box conjointly forming the bearings for this rock-shaft and holding it. Rigidly secured to this rock-shaft 45 within the box J and meshing the racks R and U secured to the cutter-bars, is a spur-pinion Q, and rocker-arms 2 2 are rigidly secured to the projecting ends of the rock-shaft.

The inner end of the upper cutter-bar L is bent upward to pass over the pinion Q and engage it, the blank portion of the rack R extending down the bend of this cutter-bar to strengthen it. The upper portion J' of the box is provided with inwardly-extending flanges $j^4$. These flanges extend only a part of the distance of the length of this box, which is to provide for the removal of the upper portion J', which is accomplished by removing the bolts $j$ and moving the upper cutter-bar outwardly until it disengages these flanges. (Shown in Fig. 5.) These flanges $j^4$ serve as a guide or support for the inner end of the upper cutter-bar.

The outer end of the lower portion J of the box is open for the purpose of inserting and removing the cutter-bars, the outer end of the upper portion J' continuing downward and outward to cover the outer end of the lower portion J of the box. A pitman comprising a head and rod portion P and a frame P', pivoted to this rod portion, connects the driving mechanism and the rocker-arms 2 2, the rod portion extending through a horizontal slot 88 in the frame, the pivotal connection being at $p'$ to the cross-bar $p$ of the frame, and the slot is of sufficient length to permit the frame to adjust itself to the shifting positions of the cutter-bars, the rod portion normally bearing against the rear end of the slot, and the outer end portions of the frame are split or parted to stride the rocker-arms, to which they are connected by means of pins 2', extending through corresponding holes in the outer portions of the frame and the rocker-arms.

To prevent the pitman from binding upon the pin 1 of the crank H when the cutter-bars shift rearwardly, the bore in the head portion of this pitman converges slightly from the ends toward the center. The forward end of the bar 5 enters an indentation $j^5$ in the lower portion J of the box, which indentation is located opposite the guide-bar 46 and the cutter-bars. The open coiled spring 4, located on this bar and pressing against the inside of the rear wall of the shoe K, and the pin 5', extending through this bar, forces this bar 5, and consequently the inner end of said guide-bar and cutter-bars, forward to their normal position. The forward ends of the grooves $b^3$ in the keepers $b$ are closed, which serve as forward stops for the guide-bar and cutter-bars. The lower end of the flat spring 6, secured to the outside of the shoe X, is provided with a slot 6'. The link 7 extends through this slot and is held by a pin 7ᵃ, which extends through one of a series of perforations 7' in this link. The outer end tension of the cutter-bars may be regulated by adjusting the link 7 upon the forwardly-drawing bow-spring 6, and the tension of the inner end of the cutter-bars may be regulated by inserting the pin 5' through any one of a series of perforations 5ᵃ in the bar 5. The shoe X is provided with outwardly-extending edges X², which protect the mechanism secured to the outside of this shoe. From this it will be seen that when the machine is drawn forwardly it will cause the arms 2 to rock, imparting a reciprocating movement to the cutter-bars; that these rocker-arms have leverage power over the cutter-bars, affording great cutting power, and that the cutter-bars operate as well in a perfect upright position as in a horizontal position, the pitman and the rocker-arms working freely at the sides of the box J. It will also be observed that the guide-bar 46 is normally held directly above the drag-bar 10; that only the cutting portion of the cutter-bars extend forward of this guide-bar and drag-bar, and that the cutter-bars are held under spring tension, so that when they encounter any obstruction they will automatically shift backwardly to a point where the strain of such obstruction is against the said drag-bar and automatically return when released from such obstruction, and that either end of the cutter-bars can automatically recoil independently of the other end, which movement is essential when an obstruction strikes one end of the cutter-bars. The guide-bar 46, upon which the cutter-bars work, has its ends slightly rounded, (shown at $b'$,) so that it cannot bind in the grooves of the keepers $b$ when one end of the cutter-bars recoil, and these keepers are countersunk into the top end portions of this guide-bar, so that the cutter-bars can work over the said keepers.

The cutter-bars comprise two long bars each provided with a series of sectional knives $L'$ $M'$. These sectional knives are secured to their respective bars in such a manner that they conjointly form a cutting edge. These sectional knives are countersunk into their respective bars to a depth equal to their thickness, and both ends of the rivets which secure these knives are also countersunk. (Shown in Fig. 14.) It should also be observed that these bars L and M are very wide and that sundry of the guides Y are located near the front portion and sundry of them near the rear portion of these bars, which will cause the knives $L'$ and $M'$ to be held close together, insuring perfect cutting.

In order to get the cutter-bars positioned as close to the ground as possible for close cutting, the material of which the shoe K is constructed is reduced in thickness and the drag-bar 10 is reduced in thickness and correspondingly increased in width, and to insure sufficient strength this shoe is constructed of a material which combines great strength and elasticity. The bottom of this shoe K to a width equal to the length of the keeper $b$, secured to this shoe, is flat, both the top side and the under side of the bottom being perfectly flat, and the tongue or draft-pole T should be carried at the height that will cause this shoe to slide flatly on the ground. The drag-bar is countersunk into the shoe K to a depth equal to the thickness of itself, and to further strengthen the shoe the drag-bar is countersunk some distance from the inner end of the shoe, and the portions $84'$ of the yoke 84 are also intended to hold and strengthen this shoe. A rod 80, secured to the front portion of the shoe K, guides the grain into the cutter-bars.

The rock-shaft 70, the crank-arm 71, and the loops 73, secured to the said rock-shaft, the closed coiled spring 72, extending from this crank-arm to the left portion of the main frame, the bar 69, connecting this crank-arm with the shoe K of the drag-bar, the angle-piece V, pivotally held by loops 22, secured to the main frame, the connection 26, which connects the crank-arm with one arm of the angle-piece, and the bar 25, which connects the yoke 84 of the coupling-frame with the other arm of the angle-piece, constitute the mechanism for controlling the cutting apparatus with the feet. By this arrangement the driver has constant and perfect control of the cutting apparatus. He can depress, lift, and quickly bring it to a perfect upright position and lower it by exerting a lifting effect on one loop and a depressing effect on the other loop. The tension of the spring 72 can be regulated by the adjustable connection $72'$ on the main frame.

The connection 26 consists in the combination of a chain and a closed coiled spring, the chain extending through the spring, the ends of the spring engaging such links in the chain which will leave the inclosed portion of the chain slightly relaxed. By thus combining this chain and spring the inner end of the cutting apparatus can rise above and fall below the horizontal line independently to follow unevenness of the ground. The bar 69 engages the shoe K of the cutting apparatus at a point above and outward from the axial pins 78 and exerts a lifting effect over the outer end of the cutting apparatus, while the connections 25 and 26 simultaneously exert a similar effect over the inner end of the cutting apparatus through the medium of the rock-shaft 70, which is under the immediate control of the driver. A wheel 23, provided with a notch or recess $23'$, is secured to the rock-shaft 70, and a pawl $23^a$ is pivotally held to the bar $D^4$ by means of loops $23^b$. This pawl $23^a$ extends outward and downward from its pivotal point and rests upon the rim of the wheel 23. When the cutting apparatus is brought to a vertical position, this pawl drops into the recess $23'$ in the wheel 23, automatically locking the said rock-shaft, and this pawl $23^a$ is provided with an upward-extending projection, by which it may be disengaged by hand. The means for raising and lowering the cutting apparatus for high and close cutting consists of the eccentric shaft 44, held by the loops $44^a$, secured to the rear portion of the drag-bar 10, the ratchet-frame 20, secured to the bar $d$, the lever O, pivoted to this frame and provided with a latch mechanism 21, which engages the ratchet of the said frame, and the chain 43, which connects this lever O with the crank portion $44^b$ of the eccentric shaft 44, which crank terminates vertically opposite the pivotal pins 78. When the cutting apparatus rests on the ground, the crank $44^b$ is at its highest point and the lower end of the lever O is at its forwardmost point. When the upper end of this lever O is moved forwardly, it will cause the eccentric formations $44'$ to be pressed against the ground and raise the cutting apparatus. When the latch mechanism of this lever is released, the cutting apparatus is lowered by its own weight. The lever O also operates a shaft 75 by means of a crank-arm $a$, secured to this shaft, and a bar 77, which connects this crank-arm with this lever. This shaft 75 is held by means of loops 74, secured to the transverse bar N, the outer end of this shaft extending beyond the main frame and is provided with a keeper 76, which strides the shaft 44 and the drag-bar 10 when they are in a vertical position.

When the cutting apparatus is in a vertical position and the rock-shaft is locked, the keeper 76 should be caused to engage the drag-bar, (otherwise the strain on the rock-shaft and its arm would be too great,) and it is for this reason that the rock-shaft can only be locked when the cutting apparatus is in a position to be engaged by this keeper 76.

The main axle is divided into two parts B and B', and the drive-wheels c are rigidly secured to this axle. The collars 24, secured to this axle and working against the inner sides of the bearings 3, prevent the two parts B B' from working apart. The chain-wheel E is loosely held on this axle at a point over the division of the axle. The hub of this chain-wheel has clutch terminations which are engaged by corresponding clutch-sleeves 27 27, which are located one near the inner end of each section B and B' and are provided with longitudinal slots 27ª, which ride upon pins 27', extending through the axle. These clutch-sleeves are pressed into engagement with the sprocket E by means of springs 27ᶜ, located upon the axle and backed by the bearings 3', secured to the bars d d'.

The clutch-sleeves 27 are made to disengage and reëngage the sprocket E by means of clutch-levers 81 81, pivoted in an oblique position to the flanges 8 8, secured to the insides of the bars d and d' and fitting into annular grooves 27ᵇ 27ᵇ upon these clutch-sleeves, and which clutch-levers are of such conformation that they can be operated conjointly by hand. To disengage the clutch mechanism the free ends of these levers 81 are moved inwardly until the pawls l l, pivoted to these levers, drop into the recesses 9' 9' in the bar 9, fixed between the bars d and d'. (Shown in Figs. 1 and 4.) A wheel 28, revolubly held upon a shaft 28ª, secured to hangers 28ᵇ, which are adjustably secured to the bars d and d', guides the chain belt e and prevents the sprocket-wheel E from working sidewise upon the axle, this wheel 28 being located in close proximity with the large sprocket-wheel. A seat s, mounted on a seat-post D', is secured to the rear portion of the main frame.

It should be noted that the eccentric formation 44' at the outer end of the cutting apparatus is located under the keeper b, which is shaped to conform, which prevents grass or other material from gathering upon it, and that when the cutting apparatus is raised to a vertical position its weight is thrown upon the chain 26, the inclosing spring lengthening to that extent.

Having described my invention, I claim as new and desire to secure by United States Letters Patent—

1. The combination, in a mowing-machine, of a wheeled supporting-frame, a driving mechanism held by said supporting-frame, and actuated by the wheels of said supporting-frame, a pivotally-held drag-bar or ground-bar, cutter-bars or sickles connected with said drag-bar or ground-bar, the connection being such as to permit a reciprocating movement of the said cutter-bars or sickles in a direction parallel with the length of the said drag-bar or ground-bar and a yielding movement, relative to said drag-bar or ground-bar, in a direction transverse to the length thereof, and means to connect said cutter-bars or sickles to said driving mechanism, to reciprocate them in opposite directions.

2. The combination, in a mowing-machine, of a wheel-supported frame, a driving mechanism secured thereto, an operating-shaft rotated by the said supporting-wheels, and operating the said driving mechanism, a holder connected to said wheel-supported frame, a drag-bar connected to said holder, cutter-bars superposed upon the drag-bar, means connecting the cutter-bars to said drag-bar permitting a reciprocative movement of the said cutter-bars, yielding means normally holding the cutting edges of the cutter-bars in advance of the drag-bar but permitting the cutter-bars to be forced backwardly until the cutting edges thereof are above the drag-bar, and means to connect the cutter-bars to the driving mechanism, to reciprocate them in opposite directions.

3. The combination, in a mowing-machine, of a wheel-supported frame having a driving mechanism, an operating-shaft rotated by the said supporting-wheels, and operating said driving mechanism, a holder connected to said wheel-supported frame, a drag-bar pivoted to said holder, the drag-bar being provided with keepers, a guide-bar upon the drag-bar, and working transversely, relatively to said drag-bar, and held by the said keepers, two cutter-bars upon the said guide-bar, means to secure said cutter-bars to said guide-bar, and means to connect said cutter-bars to the driving mechanism, to reciprocate them in opposite directions.

4. In a mowing-machine, in combination with the drag-bar, of a grooved keeper secured to one end of said drag-bar, a grooved keeper secured at the other end of said drag-bar, a guide-bar upon the drag-bar, and working in the grooves of said keepers, two cutter-bars reciprocally held upon the said guide-bar, the ends of the guide-bar being rounded, a box secured to said guide-bar, a rack secured to the uppermost cutter-bar, a rack secured to the lowermost cutter-bar, a rock-shaft extending through the said box, a pinion secured to said rock-shaft, and meshing the said racks, perforated rocker-arms secured to said rock-shaft, and stops to limit the shifting movements of the cutter-bars.

5. In a mowing-machine, in combination with the drag-bar, of a keeper secured to the outer end of the drag-bar, a keeper secured at the inner end of the drag-bar, each one of the said keepers having a longitudinal, horizontal groove, a guide-bar above the drag-bar, and engaging the said grooves, a box secured to the inner portion of the guide-bar, two cutter-bars, each provided with a rack, extending from said box, and working upon the guide-bar, the forward ends of the grooves being closed, to form forward stops for the guide-bar and cutter-bars, a rock-shaft extending through said box, the box being in two parts, the two parts conjointly forming the bearings for the rock-shaft, a spur-pinion within the box, and secured to the rock-shaft, and meshing the said racks, a rocker-arm secured to the projecting portion of one end of the rock-shaft, a rocker-arm secured to the other projecting end of the rock-shaft, the said rocker-arms being adapted to engage a suitable pitman, the said guide-bar working slidably in the said grooves, whereby when the cutter-bars encounter any obstructions the said cutter-bars automatically move backwardly to a point where the strain of such obstructions is on the drag-bar, and automatically return to their normal position when released from such obstructions, the ends of the guide-bar being rounded, whereby either end of the cutter-bars can automatically recoil independently of the other end, the said keepers being countersunk in the top, end portions of the guide-bar, so that the cutter-bars can work over the keepers.

6. In a mowing-machine, the combination of the shoe K, the drag-bar 10, the divider or shoe X, the keeper $b$ secured to the inner end of the shoe K, the keeper $b$ secured to the outer end of the drag-bar, the guide-bar 46 working in the grooves of these keepers, the box J, J' secured to the guide-bar, and provided with the guides $j^4$ and the perforated flanges $j^2, j^3$, and the bolts $j$, the sickles L and M, provided with slots 3 and with racks R and U, the guides Y, the perforated bar 5, the pin 5', the spring 4 upon the bar 5, and confined between the wall of the shoe K and the pin 5', the spring 6, the perforated lug $46^a$, the perforated link 7, the pin $7^a$, the rock-shaft 45, the rocker-arms 2, 2, and the spur-pinion secured to the rock-shaft.

7. In a mowing-machine the combination with a wheel-supported frame, of a holder connected thereto, a cutting apparatus pivoted on said holder, a rock-shaft journaled within said frame and extending longitudinally thereto, a hanger secured to said rock-shaft, a spring connected to the hanger and to the main frame, a bar connecting the hanger to the cutting apparatus at a point above the pivotal center thereof, a cross-piece on said rock-shaft, and loops on said cross-piece adapted to be engaged by both feet of the machine operator, the arrangement being such that by depressing one of the said loops and raising the other of said loops the rock-shaft may be rotated and the cutting apparatus turned on its pivotal center, as and for the purpose specified.

8. In a mowing-machine, in combination with a wheel-supported frame, the coupling-frame connected thereto, which consists in the combination of the shaft 42', the bars I, I, the yoke 84 and the bar, $n$, a cutting apparatus hinged to said coupling-frame, a rock-shaft secured within said wheel-supported frame, a hanger secured to said rock-shaft, a spring having one end adjustably connected to the main frame, and the other end connected to the hanger, a bar connecting the hanger with the cutting apparatus, the said bar being connected to the cutting apparatus at a point above the connection between the cutting apparatus and the coupling-frame, an angle-lever fulcrumed to the main frame, a bar connected with the outer end of the coupling-frame and to one end of said lever, a chain connected with said hanger and with the other end of said lever, a spring inclosing the said chain, the ends of said inclosing spring engaging such links in the chain which will cause the inclosed portion of said chain to be slightly relaxed when the cutting apparatus is in its normal operative position, the keeper-wheel secured to said rock-shaft, the pawl pivoted adjacent to said keeper-wheel, and arranged to automatically lock the rock-shaft when the cutting apparatus assumes a vertical position, and loops secured to said rock-shaft, whereby the driver can at will, depress, counterbalance, raise to a perfect upright position, also lower, the cutting apparatus with his feet, as and for the purpose specified.

9. In a mowing-machine, the combination of a wheel-supported frame, a coupling-frame connected thereto, a cutting apparatus pivoted to said coupling-frame, a shaft extending parallel with the length of the cutting apparatus, and movably secured thereto, the said shaft being provided with eccentrics, and means to operate said shaft, as and for the purpose set forth.

10. In a mowing-machine, the combination of a wheel-supported frame, the coupling-frame connected thereto, a draft-pole rigidly secured to said wheel-supported frame, the shoe K hinged to the coupling-frame, a drag-bar, provided with a cutter, secured to said shoe, a shaft movably secured to said drag-bar, and located at the rear edge thereof, the said shaft being bent to form eccentrics 44', 44', and a crank $44^b$, an operating-lever, and a chain to connect said crank to said operating-lever, whereby said cutter can be raised and lowered independently of the main frame, for high and close cutting, without tilting said cutter or drag-bar, as and for the purpose set forth.

11. In a mowing-machine, the combination with the main frame, the axle divided in two parts, and revolubly secured to the main frame by bearings 3, 3, and 3', 3', and the collars 24, drive-wheels rigidly secured to the axle, the bars $d$, $d'$, the clutch sprocket-wheel loosely mounted on the axle at a point over its division, the clutch-sleeves 27, the springs $27^c$ upon the axle and backed by the bearings $3'$, $3'$, secured to the bars $d$, $d'$, the keeper-bar 9, the pivoted clutch-levers engaging the clutch-sleeves, the pawls $l$, $l$ pivoted to said levers, and adapted to engage the keepers in said keeper-bar, and the guide-wheel located in close proximity to the sprocket E.

12. In a mowing-machine, the combination with a main frame, of a pivotally-secured drag-bar, means for raising the drag-bar to a vertical position, a transversely-disposed rock-shaft, the outer end of said rock-shaft extending beyond the main frame, a forked keeper secured to the outer end of said rock-shaft, and adapted to engage the drag-bar when the same is in a vertical position, an operating-lever, and a bar connecting said lever with the rock-shaft, whereby the latter may be rotated to throw the forked keeper into or out of engagement with the drag-bar, substantially as and for the purpose set forth.

OLIVER ELISON.

Witnesses:
HENRY AEVERMANN,
M. M. ELISON.